United States Patent [19]

Maruya et al.

[11] Patent Number: 5,001,182
[45] Date of Patent: Mar. 19, 1991

[54] RESIN COMPOSITION FOR AUTOMOBILE BUMPER

[75] Inventors: Kazuo Maruya, Yokohama; Hidehiko Ooguchi, Musashimurayama; Masamichi Suzuki, Yokohama; Koji Sugawara, Tokyo; Ikuo Hirai, Ichihara, all of Japan

[73] Assignees: Mitsui Petrochemical Industries, Ltd., Tokyo; Nissan Motor Co., Ltd., Kanagawa, both of Japan

[21] Appl. No.: 209,950

[22] Filed: Jun. 22, 1988

[30] Foreign Application Priority Data

Jun. 23, 1987 [JP] Japan ................................. 62-154506

[51] Int. Cl.$^5$ .......................... C08K 3/34; C08K 3/26; C08L 23/16
[52] U.S. Cl. .................................... 524/427; 524/451; 524/505
[58] Field of Search .................. 524/505, 427, 451

[56] References Cited

U.S. PATENT DOCUMENTS

| | | | |
|---|---|---|---|
| 4,153,587 | 5/1979 | Yui | 524/505 |
| 4,621,114 | 11/1986 | Watanabe | 524/505 |
| 4,626,565 | 12/1986 | Kawai | 524/505 |
| 4,705,818 | 11/1987 | Kawai | 524/505 |
| 4,737,536 | 4/1988 | Kawase | 524/505 |

Primary Examiner—C. Warren Ivy
Attorney, Agent, or Firm—Birch, Stewart, Kolasch & Birch

[57] ABSTRACT

A resin composition excellent in impact resistance, rigidity and coatability properties, is easily moldable without causing voids and flow marks, and is suitable for the manufacture of automobile bumpers, which has a melt flow rate of not lower than 10 g/10 min. and which comprises:

(A) 60 to 85 parts by weight of a crystalline propylene/ethylene block copolymer component having an ethylene unit content of 10 to 30 mole % and a melt flow rate of 10 to 30 g/10 min. (Comopnent A), (B) 5 to 20 parts by weight of an non-crystalline ethylene/alpha-olefin random copolymer component having an ethylene unit content of 60 to 85 mole %, a melt flow rate of 0.1 to 5.0 g/10 min and a crystallinity, measured by X-ray, of not more than 15% (Component B), and (C) 8 to 15 parts by weight of a talc or calcium carbonate component having an average particle size of 0.1 to 5 $\mu$ (Component C), in which values by the "parts by weight" are selected so as to amount to 100 parts by weight in total.

2 Claims, 1 Drawing Sheet

RESIN COMPOSITION FOR AUTOMOBILE BUMPER

INDUSTRIAL FIELD OF THE INVENTION

This invention relates to a resin composition for automobile bumpers. More specifically, it relates to a resin composition which is excellent in impact resistance, rigidity and coatability properties, easily moldable without causing any void and flow mark, and suitable for manufacture of automobile bumpers.

PRIOR ART

Crystalline polypropylene has excellent properties in respect of rigidity, heat resistance and glossness. However, crystalline polypropylene has the defect in that it is inferior with respect to properties of impact resistance, especially at a low temperature, and to coatability. Therefore, it has found limited use in the field where impact resistance and coatability are required, e.g., in the field of automobile bumpers.

There has been a proposal for a method of mixing crystalline polypropylene with polyethylene or a rubbery substance such as polyisobutylene, polybutadiene, non-crystalline ethylene/propylene copolymer, etc., in order to improve the above-mentioned defects. And it has been also proposed to incorporate an inorganic filler such as talc in order to improve the decrease of the rigidity caused by the addition of the above rubbery substances.

For example, Japanese Laid-Open Patent Publication No. 55952/1982 discloses a polypropylene composition for molding bumpers which comprises a crystalline ethylene/propylene block copolymer having an ethylene content of 5 to 10% by weight and a melt flow rate (MFR) of 2 to 10 g/10 min., an amorphous ethylene/propylene copolymer having an inherent viscosity of 2.0 to 3.5 dl/g, and talc. Japanese Laid-Open Patent Publication No. 15841/1982 also discloses a high-density polyethylene-added polypropylene composition. However, the polypropylene composition disclosed in Japanese Laid-Open Patent Publication No. 55952/1982 has problems in that its impact resistance is not sufficient and that its moldability is poor since the ethylene content in the main component, ethylene/propylene block copolymer, is as low as 5 to 10% by weight, and since the melt flow rate thereof is as low as 2 to 10 g/10 min. On the other hand, the polypropylene composition disclosed in Japanese Laid-Open Patent Publication No. 159841/1982 aims to improve, by addition of a high-density polyethylene, insufficient impact resistance caused by the low ethylene content in the ethylene/propylene copolymer which is the main component. However, addition of a high-density polyethylene sometimes causes a difficulties in that the polyethylene is not uniformly dispersed in the polypropylene. As a result, there have been problems in that the coatability of the molded articles is not good, etc. In order to solve these problems, Japanese Laid-Open Patent Publication No. 13838/1985 discloses a polypropylene composition which comprises (a) 50 to 70% by weight of a propylene/ethylene block copolymer having an ethylene content of 15 to 34 mole % and a melt flow rate of 10 to 60 g/10 min., (b) 25 to 40% by weight of an ethylene/alpha-olefin random copolymer having an ethylene content of 60 to 85 mole %, a melt flow rate of 0.1 to 2 g/10 min. and a crystallinity, measured by X-ray, of not larger than 10 and (c) 3 to 20% by weight of talc. The above polypropylene composition is excellent in impact resistance, rigidity and coatability properties. Since, however, the content of the above component (b), ethylene/alpha-olefin random copolymer, is as high as 25 to 40% by weight, said copolymer has a problem concerning moldability, i.e., voids and flow marks occur when it is molded into automobile bumpers, and the appearance of the molded articles is not always satisfactory.

SUMMARY OF THE INVENTION

It is an object of this invention to provide a resin composition suitable for the manufacture of automobile bumpers which is excellent in impact resistance, rigidity and coatability properties, and is easily moldable without causing any void and flow mark.

According to this invention, the above object is achieved by a resin composition having a melt flow rate of not lower than 10 g/10 min. for automobile 10 bumpers which comprises:

(A) 60 to 85 parts by weight of a crystalline propylene/ethylene block copolymer component having an ethylene unit content of 10 to 30 mole % and a melt flow rate of 10 to 30 g/10 min. (Component A) wherein Component A comprises, (A-I) 50 to 80% by weight of a propylene polymer component having an isotactic index of not less than 90 (Component A-I), (A-II) from more than 16% by weight to less than 20% by weight of a propylene/ethylene copolymer component having an ethylene unit content of 40 to 60 mole % and an intrinsic viscosity of 2.0 to 4.0 dl/g (Component A-II) and (A-III) 3 to 20% by weight of an ethylene copolymer component having a propylene unit content of not more than 10 mole% and an intrinsic viscosity of 1.0 to 10.0 dl/g (Component A-III), in which the "% by weight" each of Components A-I to A-III is based on the total weight of Components A-I, A-II and A-III, (B) 5 to 20 parts by weight of a non-crystalline ethylene/alpha-olefin random copolymer component having an ethylene unit content of 60 to 85 mole %, a melt flow rate of 0.1 to 5.0 g/10 min. and a crystallinity, measured by X-ray, of not more than 15% (Component B), and (C) 8 to 15 parts by weight of a talc or calcium carbonate component having an average particle size of 0.1 to 5 $\mu$ (Component C), in which values by the "parts by weight" are selected so as to amount to 100 parts by weight in total.

DETAILED DESCRIPTION OF THE PREFERRED EMBODIMENTS

Figure 1:
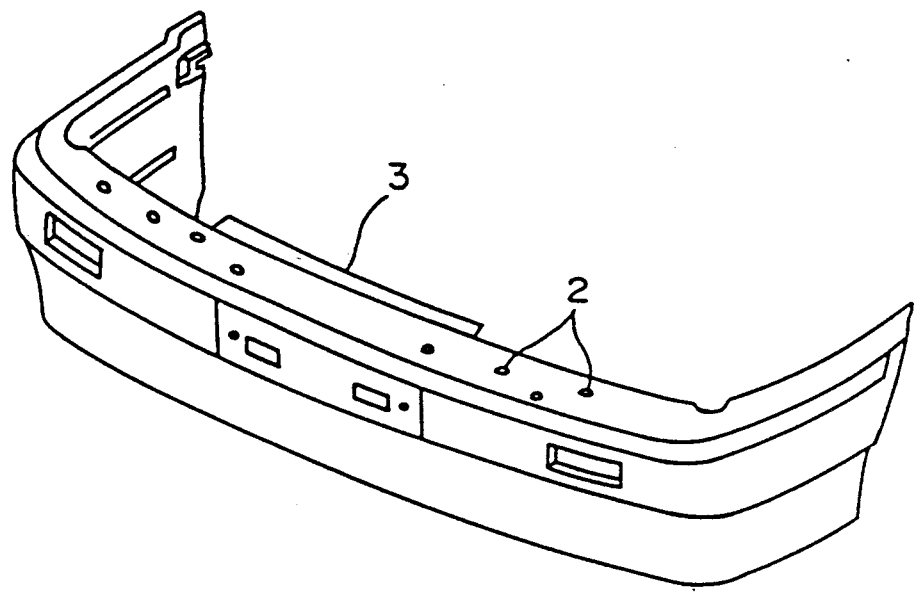
FIG. 1 is a perspective view of a bumper.

This invention is explained in detail hereinbelow.
The resin composition of this invention for automobile bumpers essentially comprises;

(A) a crystalline propylene/ethylene block copolymer component (Component A), (B) a non-crystalline ethylene/alpha-olefin random copolymer component (Component B), and (C) a talc or calcium carbonate component (Component C).

In this invention, the amount of Component A to be incorporated is 60 to 85 parts by weight, preferably 65 to 80 parts by weight per 100 parts by weight of Components A, B and C in total.

Resin compositions containing less than 60 parts by weight of the crystalline propylene/ethylene block copolymer component (Component A) are inferior in rigidity property, and resin compositions containing more than 85 parts by weight of Component A are poor in coatability and impact resistance properties.

In this invention, the amount of Component B to be incorporated is 5 to 20 parts by weight, preferably 8 to 18 parts by weight per 100 parts by weight of Components A, B and C in total.

Resin compositions containing more than 20 parts by weight of the non-crystalline ethylene/alpha-olefin random copolymer component (Component B) are inferior in rigidity property, and resin compositions containing less than 5 parts by weight of Component B have insufficient impact resistance and coatability properties.

In this invention, the amount of Component C to be incorporated is 8 to 15 parts by weight per 100 parts by weight of Components A, B and C in total.

Resin compositions containing less than 8 parts by weight of the talc or calcium carbonate component (Component C) show an insufficient effect on the improvement of rigidity, and resin compositions containing more than 15 parts by weight of Component C are brittle and show a low impact resistance property.

In the resin composition of this invention for automobile bumpers, it is desirable to adjust the melt flow rate (MFR) thereof to 10 to 30 g/10 min., especially 15 to 25 g/10 min.

Values for the "melt flow rate" described in the present specification were measured according to ASTM D 1238, condition L.

In this invention, Component A is a block copolymer of propylene and ethylene.

In this invention, Component A has an ethylene unit content (ratio of recurring units derived from ethylene) of 10 to 30 mole %, preferably 18 to 28 mole %, and a melt flow rate (MFR) of 10 to 30 g/10 min., preferably 15 to 25 g/10 min.

In this invention, Component A essentially comprises (A-I) a propylene polymer component (Component A-I), (A-II) a propylene/ethylene copolymer component (Component A-II), and (A-III) an ethylene copolymer component (Component A-III).

In this invention, the amount of Component A-I is 50 to 80% by weight, preferably 60 to 80% by weight, based on the total weight of Components A-I, A-II and A-III.

In this invention, the amount of Component A-II is more than 16% by weight based on the total weight of Components A-I, A-II and A-III, but is less than 20% by weight based on the total weight of Components A-I, A-II and A-III.

In this invention, the amount of Component A-III is 3 to 20% by weight, preferably 5 to 15% by weight, based on the total weight of Components A-I, A-II and A-III.

In this invention, Component A-I has an isotactic index (I index) of not less than 90, preferably not less than 95.

The isotactic index above stands for triadtacticity percentage measured according to $^{13}$C-NMR method.

The propylene polymer component (Component A-I) is a propylene/ethylene copolymer mainly composed of propylene homopolymer or propylene with which not more than 2 mole %, preferably not more than 1 mole %, of ethylene is random-copolymerized.

In this invention, Component A-II has an ethylene unit content of 40 to 60 mole %, preferably 40 to 50 mole %, and an intrinsic viscosity of 2.0 to 4.0 dl/g, preferably 2.5 to 3.5 dl/g.

The intrinsic viscosity above stands for the same measured in decalin at 135° C.

In the case when the intrinsic viscosity above is less than 2.0 dl/g, voids are likely to occur in the molded articles of the resultant resin compositions. On the other hand, when the intrinsic viscosity exceeds 4.0 dl/g, the moldability of the resulting resin compositions is poor, and flow marks are likely to occur.

In this invention, Component A-III has a propylene unit content of not more than 10 mole %, preferably, not more than 5 mole % and an intrinsic viscosity of 1.0 to 10.0 dl/g, preferably 2.0 to 4.5 dl/g.

In this invention, Component B is a random copolymer of ethylene and alpha-olefin.

Examples of the alpha-olefin above include propylene, 1-butene, 1-hexene, 4-methyl-1-pentene, etc. And the copolymer component (Component B) may contain, copolymerized therewith, a small amount of a diene monomer such as dicyclopentadiene, ethylidene norbornene, 1,4-hexadiene, etc.

In this invention, Component B has an ethylene unit content of 60 to 85 mole %, preferably 75 to 82 mole %, a melt flow rate of 0.1 to 5.0 g/10 min., preferably 0.2 to 3.0 g/10 min., and a crystallinity, measured by X-ray, of not more than 15%, preferably not more than 5%.

Component B having an ethylene content of more than 85 mole % and Component B having a crystallinity of more than 15% have poor compatibility with Component A, give rise to an appearance defect of the resultant articles and make only a small contribution to an effect on the improvement of impact resistance And the use of B component having an ethylene unit content of less than 60 mole % makes smaller the effect on improvement of impact resistance in extremely low temperature regions. If the melt flow rate of Component B exceeds 5 g/10 min., the impact resistance property of the resultant resin composition is not much improved.

In this invention, Component C has an average particle size of 0.1 to 5 $\mu$, preferably 0.5 to 4 $\mu$. In the case when the above average particle size exceeds 5 $\mu$, the mechanical strength, particularly impact strength of molded articles of the resultant resin compositions is sometimes deteriorated. And when Component C has an average particle size of less than 0.1 $\mu$, the resultant resin compositions give rise to a dispersion failure at the kneading time in some cases, and the effect on improvement of rigidity is also small. Untreated talc or calcium carbonate (Component C) may be used. However, in order to improve the affinity of Component C with the crystalline propylene/ethylene block copolymer component (Component A), talc or calcium carbonate may be treated with an organic titanate type coupling agent, silane type coupling agent, carboxylic acid-modified polyolefin, etc., or may be used in combination therewith.

The above crystalline propylene/ethylene block copolymer component (Component A) is what is called a non-polyblend type copolymer obtained, for example, by reacting olefins is one polymerization reaction system in the presence of a stereoregular catalyst, preferably a catalyst composed of a carried transition metal ingredient and organic aluminum compound. A process for the preparation of such a crystalline propylene/ethylene block copolymer (Component A) is disclosed in U.S. Pat. No. 4,128,606, Japanese Patent Publication No. 26613/1982, etc.

The crystalline propylene/ethylene block copolymer (Component A) for use in this invention may be not only a single copolymer obtained by polymerization in one polymerization reaction system but also a mixture of two or more propylene/ethylene copolymers which are separately polymerized In the latter case, however, the mixture has to have an ethylene unit content and MFR in the afore-specified ranges.

The ethylene unit content in this invention stands for a value for same measured according to $^{13}$C-NMR method.

The above-mentioned non-crystalline ethylene/alpha-olefin random copolymer component (Component B) is usually produced by the use of a vanadium compound/organic aluminum compound combined catalyst. Specifically, it can be produced by using hexane as a solvent, adding vanadium trichloride thereto, then dissolving an ethylene/alpha-olefin mixed gas therein until saturation, and thereafter adding a solution prepared by predissolving ethylaluminum sesquichloride in hexane, to carry out the polymerization.

Talc or calcium carbonate usually commercially available as an inorganic filler is used as the talc or calcium carbonate component (Component C) of this invention.

The resin composition of this invention can be obtained by mixing the crystalline propylene/ethylene block copolymer component (Component A), the ethylene/alpha-olefin random copolymer component (Component B) and the talc or calcium carbonate component (C component) in the above-mentioned scopes by the use, for example, of a Henschel mixer, V-blender, ribbon blender, tumbling mixer, etc., and then melt-kneading the resultant mixture by the use of a single screw extruder, multi-screw extruder, kneader, Banbury mixer, etc. Particularly, the use of an apparatus having excellent kneading performance such as a multi-screw extruder, kneader, Banbury mixer, etc., makes it possible to obtain high-quality resin compositions, for automobile bumpers, in which the components are dispersed the more uniformly.

At any stage when the components for the resin composition of this invention are mixed, it is possible to incorporate thereto various fillers such as an antioxidant, ultraviolet absorbing agent, lubricant, nucleating agent, antistatic agent, flame retardant, pigment or dye, the other inorganic or organic fillers, reinforcing agents, and the like as far as the incorporation does not affect the object of this invention.

The resin composition of this invention for automobile bumpers is excellent in melt-flowability, i.e., excellent in processability, and that the bumpers obtained by injection molding thereof are excellent in impact resistance, low-temperature impact resistance, rigidity and dimentional stability, and further, excellent in coatability. Therefore, the resin composition of this invention is suitable for manufacture of automobile bumpers.

According to this invention, it is made possible to obtain a resin composition which is excellent in impact resistance, rigidity and coatability properties, easily moldable without causing any void and flow mark and suitable for manufacture of automobile bumpers.

The following examples give specific explanation of this invention.

Table 1 shows crystalline propylene/ethylene block copolymer components (Component A) used in Examples and Comparative Examples. In Table 1, A1, A2 and A3 are within the scope of Component A of this invention, and A4 and A5 are outside the scope of Component A of this invention.

Table 2 shows non-crystalline ethylene/alpha-olefin random copolymer components (Component B) used in Examples and Comparative Examples. In Table 2, B1 and B2 are within the scope of Component B of this invention, and B3 is outside the scope of Component B of this invention. Table 3 shows talc and calcium carbonate components (Component C) used in Examples and Comparative Examples. In Table 3, C1 and C2 are within the scope of Component C of this invention, and C3 is outside of Component C of this invention.

TABLE 1

Component A: Crystalline propylene/ethylene block copolymer components used in Example and Comparative Examples

| Component A | | A1 | A2 | A3 | A4 | A5 |
|---|---|---|---|---|---|---|
| Ethylene unit content | | 20 | 23 | 25 | 25 | 20 |
| Melt flow rate g/10 min. | | 21 | 18 | 16 | 28 | 7 |
| Component A-I | I index | 96 | 96 | 97 | 95 | 97 |
| | Component amount wt. % | 77 | 73 | 69 | 60 | 66 |
| Component A-II | Ethylene unit content mole % | 48 | 48 | 46 | 49 | 45 |
| | Intrinsic viscosity dl/g | 2.2 | 2.7 | 2.9 | 1.5 | 4.2 |
| | Component amount wt. % | 17 | 18 | 19 | 20 | 15 |
| Component A-III | Propylene unit content mole % | 1.5 | 2.2 | 3.4 | 3.5 | 1.7 |
| | Intrinsic viscosity dl/g | 2.3 | 2.8 | 3.0 | 2.0 | 4.1 |
| | Component amount wt. % | 6 | 9 | 12 | 20 | 19 |

I index: Isotactic index

TABLE 2

Component B: Non-crystalline ethylene/alpha-olefin random copolymer components used in Examples and Comparative Examples

| Component B | B1 | B2 | B3 |
|---|---|---|---|
| Ethylene unit content mole % | 82 | 80 | 82 |
| Melt flow rate g/10 min. | 1.8 | 0.7 | 7 |
| Crystallinity % | 3.8 | 3.5 | 4.5 |

TABLE 3

Component C: Talc and calcium carbonate components used in Examples and Comparative Examples

| Component C | C1 | C2 | C3 |
|---|---|---|---|
| | talc | calcium carbonate | talc |
| Particle diameter | 1.0 | 2.0 | 7 |

EXAMPLES

The following Examples illustrate this invention specifically. However, this invention shall not be limited to these Examples unless there is a deviation from the gist of this invention.

PREPARATION OF RESIN COMPOSITION

Example 1

| Components | |
|---|---|
| A1 of Table 1 | 74 parts by weight |
| B1 of Table 2 | 12 parts by weight |
| C1 of Table 3 | 14 parts by weight |
| Carbon black | 1 part by weight |
| Antiheat stabilizer (product name: Yoshinox BHT, made by Yoshitomi Parmaceutical Co.) | 0.1 part by weight |
| Antiheat stabilizer (product name: Irganox 1010, made by Musashino-Geigy Co.) | 0.1 part by weight |

The above components were mixed in a Henschel mixer and then formed into particles by the use of a twin-screw extruder (model PCM30 made by Ikegai Iron Works) at a resin temperature of 220° C. to give a particulate resin composition.

The melt flow rate of the resultant resin composition was measured according to ASTM D 1238, condition L.

Examples 2-5

In each of the Examples 2-5, Component A of Table 1 Component B of Table 2 and Component C of Table 3 were used as shown in Table 4, and the mixing and particle-forming procedures were carried out in the same way as in Example 1 to give a particulate resin composition.

Melt flow rates of the resultant resin compositions were measured according to ASTM D 1238, condition L.

Comparative Examples 1–4

In each of the Comparative Examples 1–4, Component A of Table 1, Component B of Table 2 and Component C of Table 3 were used as shown in Table 5, and the mixing and particle-forming procedures were carried out in the same way as in Example 1 to give a particulate resin composition.

Melt flow rates of the resultant resin compositions were measured according to ASTM D 1238, condition L.

The melt flow rates measured in the above Examples and Comparative Examples are shown in Tables 4 and 5.

TABLE 4

Components A, B and C and amounts thereof in Examples 1-5 and melt flow rates of the resultant resin compositions

| | | Ex. 1 | Ex. 2 | Ex. 3 | Ex. 4 | Ex. 5 |
|---|---|---|---|---|---|---|
| Component A | Component used | A-1 | A-2 | A-3 | A-1 | A-1 |
| | Part by weight | 74 | 74 | 74 | 70 | 78 |
| Component B | Component used | B1 | B1 | B1 | B1 | B2 |
| | Part by weight | 12 | 12 | 12 | 16 | 12 |
| Component C | Component used | C1 | C1 | C1 | C1 | C2 |
| | Part by weight | 14 | 14 | 14 | 14 | 10 |
| Melt flow rate g/10 min. | | 19 | 17 | 15 | 16 | 16 |

TABLE 5

Components A, B and C and amounts thereof in Comparative Examples 1–4 and melt flow rates of the resultant resin compositions

| | | CEx. 1 | CEx. 2 | CEx. 3 | CEx. 4 |
|---|---|---|---|---|---|
| Component A | Component used | A-4 | A-5 | A-1 | A-1 |
| | Part by weight | 74 | 74 | 74 | 74 |
| Component B | Component used | B1 | B2 | B1 | B3 |
| | Part by weight | 12 | 12 | 12 | 12 |
| Component C | Component used | C1 | C1 | C3 | C1 |
| | Part by weight | 14 | 14 | 14 | 14 |
| Melt flow rate g/10 min. | | 24 | 6 | 18 | 23 |

Molding of resin composition and evaluation of molded article

Particulate resin compositions obtained in Examples 1 to 5 and Comparative Examples 1 to 4 were molded into test pieces by the use of an injection molding machine (model IS220E made by Toshiba Kikai) at a clamping force of 200 tons at a resin temperature of 200° C.

Initial flexural moduli, tensile strengths, Izod impact strengths and falling weight impact strengths of the above test pieces were measured according to methods listed below.

Initial flexural modulus kg/cm$^2$) : ASTM D 790
Tensile Strength (kg/cm$^2$) : ASTM D 638
Izod impact strength (kg-cm/cm) : ASTM D 256
Falling weight impact strength (kg-cm): Darts having an apex diameter of ½ inch and a weight of 3 kg were allowed to fall on 120×130×3 mm samples from various heights at atmopshere of −30° C. to determine energy values when 50% of the samples were broken.

Tables 6 and 7 show the results of above measurements.

TABLE 6

Physical properties of test pieces of the resin compositions obtained in Examples 1-5

| | | Ex. 1 | Ex. 2 | Ex. 3 | Ex. 4 | Ex. 5 |
|---|---|---|---|---|---|---|
| Initial flexural modulus kg/cm$^2$ | 23° C. | 12800 | 12500 | 12100 | 12000 | 11700 |
| | 80° C. | 3600 | 3400 | 3200 | 3100 | 3000 |
| Tensile strength kg/cm$^2$ | | 170 | 160 | 160 | 150 | 150 |
| Izod impact strength kg-cm/cm, −40° C. | | 6 | 7 | 8 | 8 | 8 |
| Falling weight impact strength kg-cm, −30° C. | | 380 | 400 | 450 | 460 | 450 |

TABLE 7

Physical properties of test pieces of the resin compositions obtained in Comparative Examples 1–4

| | | CEx. 1 | CEx. 2 | CEx. 3 | CEx. 4 |
|---|---|---|---|---|---|
| Initial flexural modulus kg/cm$^2$ | 23° C. | 12200 | 12600 | 13000 | 12800 |
| | 80° C. | 3300 | 3500 | 3800 | 3500 |
| Tensile strength kg/cm$^2$ | | 155 | 160 | 175 | 170 |
| Izod impact strength kg-cm/cm, −40° C. | | 6 | 7 | 3 | 4 |
| Falling weight impact strength kg-cm, −30° C. | | 360 | 370 | 190 | 210 |

The resin compositions obtained in Examples 1 to 5 and Comparative Examples 1 to 4 were shaped into bumpers as shown in FIG. 1 by the use of a bumper molding machine (made by Kobe Steel, Ltd.) at a clamping force of 2,500 tons, at a resin temperature of 200° C., at injection pressures of 800 kg/cm² (primary) and 500 kg/cm² (secondary) and at an injection speed of 24 mm/sec.

The bumpers obtained had a length of 1,500 mm, depth of 300 mm, height of 300 mm, front thickness of 3.5 mm and side thickness of 3.5 mm.

The bumpers obtained were examined to see the presence or absence of flow marks and voids. Tables 8 and 9 show the results of the examinations.

The "flow mark" here means a wave-shaped pattern which appears on the surface of a molded article (bumper), and the "void" means a hollow space which occurs inside a molded article (bumper), i.e., a spatial region in which no resin composition is present.

On the surface of a bumper in which a void occurs, in general, a nearly circular or elliptical depression usually called "sink" appears. The portion of the "sink" is usually clearly recognized even after a bumper is coated.

Figure 2:
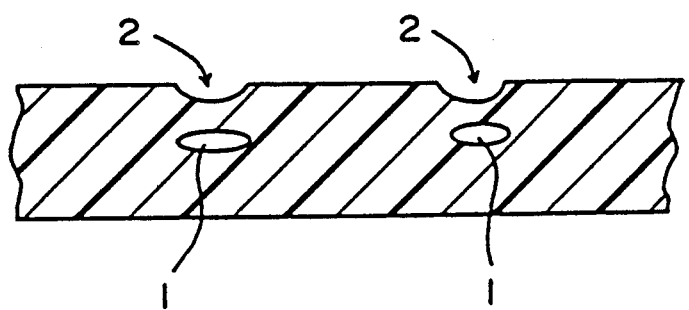
FIG. 2 is a cross sectional veiw of a bumper having voids and sinks.
Numeral 1 indicates voids, 2 indicates sinks and 3 indicates a gate.

FIG. 2 shows a cross sectional view of a bumper having voids and sinks.

TABLE 8

Presence (P) or absence (A) of flow mark and voids in bumpers manufactured by using the resin compositions of Examples 1–5

| Resin composition used | Ex. 1 | Ex. 2 | Ex. 3 | Ex. 4 | Ex. 5 |
|---|---|---|---|---|---|
| Flow mark | A | A | A | A | A |
| Void | A | A | A | A | A |

TABLE 9

Presence (P) or absence (A) of flow mark and voids in bumpers manufactured by using the resin compositions of Comparative Examples 1–4

| Resin composition used | CEx. 1 | CEx. 2 | CEx. 3 | CEx. 4 |
|---|---|---|---|---|
| Flow mark | A | P | A | A |
| Void | P | A | A | P |

What is claimed is:

1. A resin composition for automobile bumpers which has a melt flow rate of not lower than 10 g/10 min. and which comprises:
    (A) 60 to 85 parts by weight of a crystalline propylene/ethylene block copolymer Component A having an ethylene unit content of 10 to 30 mole % and a melt flow rate of 10 to 30 g/10 min., and having been prepared by reacting olefins in a single reaction system in the presence of a stereoregular catalyst, wherein Component A comprises,
    (A-I) 50 to 80% by weight of a propylene polymer Component A-I composed of propylene homopolymer or propylene copolymer with which not more than 2 mole % of ethylene is random-copolymerized and having an isotactic index of not less than 90,
    (A-II) from more than 16% by weight to less than 20% by weight of a propylene/ethylene copolymer Component A-II having an ethylene unit content of 40 to 60 mole % and an intrinsic viscosity of 2.0 to 4.0 dl/g and
    (A-III) 3 to 20% by weight of an ethylene copolymer Component A-III having a propylene unit content of not more than 10 mole % and an intrinsic viscosity of 1.0 to 10.0 dl/g, in which the "% by weight" of each of Components A-I, A-II and A-III is based on the total weight of Components A-I, A-II and A-III,
    (B) 5 to 20 parts by weight of a non-crystalline ethylene/alpha-olefin random copolymer Component B having an ethylene unit content of 60 to 85 mole %, a melt flow rate of 0.1 to 5.0 g/10 min and a crystallinity, measured by X-ray, of not more than 15%, and
    (C) 8 to 15 parts by weight of a talc or calcium carbonate Component C. having an average particle size of 0.1 to 5 μ in which values by the "parts by weight" are selected so as to amount to 100 parts by weight in total.

2. The resin composition for automobile bumpers according to claim 1 which has a melt flow rate of not lower than 10 to 30 g/10 min. and which comprises:
    (A) 65 to 80 parts by weight of a crystalline propylene/ethylene block copolymer Component A having an ethylene unit content of 18 to 28 mole % and a melt flow rate of 15 to 25 g/10 min., and having been prepared by reacting olefins in a single reaction system in the presence of a stereoregular catalyst, wherein Component A comprises,
    (A-I) 60 to 80% by weight of propylene polymer Component A-I composed of propylene homopolymer or propylene copolymer with which not more than 2 mole % of ethylene is random-copolymerized and having an isotactic index of not less than 95,
    (A-II) from more than 16% by weight to less than 20% by weight of propylene/ethylene copolymer Component A-II having an ethylene unit content of 40 to 50 mole % and an intrinsic viscosity of 2.5 to 3.5 dl/g and
    (A-III) 5 to 15% by weight of an ethylene copolymer Component III having a propylene unit content of not more than 5 mole % and intrinsic viscosity of 2.0 to 4.5 dl/g, in which the "% by weight" of each of Components A-I, A -II and A-III is based on the total weight of Components A-I, A-II and A-III,
    (B) 8 to 18 parts by weight of a non-crystalline ethylene/alpha-olefin random copolymer Component B having an ethylene unit content of 75 to 82 mole %, a melt flow rate of 0.2 to 3.0 g/10 min and a crystallinity, measured by X-ray, of not more than 5%, and
    (C) 8 to 15 parts by weight of a talc or calcium carbonate Component C. having an average particle size of 0.5 to 4 μ, in which values by the "parts by weight" are selected so as to amount to 100 parts by weight in total.

* * * * *